United States Patent [19]
Strauser et al.

[11] Patent Number: 5,251,652
[45] Date of Patent: * Oct. 12, 1993

[54] STREET SWEEPER

[75] Inventors: Daniel P. Strauser, Elgin; Roger D. Star, St. Charles, both of Ill.

[73] Assignee: Elgin Sweeper Company, Elgin, Ill.

[*] Notice: The portion of the term of this patent subsequent to Oct. 29, 2008 has been disclaimed.

[21] Appl. No.: 784,169

[22] Filed: Oct. 28, 1991

Related U.S. Application Data

[63] Continuation-in-part of Ser. No. 241,329, Sep. 7, 1988, Pat. No. 5,060,334.

[51] Int. Cl.$^5$ ............................................. E01H 1/04
[52] U.S. Cl. ........................................ 134/84; 15/84; 280/711; 298/11
[58] Field of Search ...................... 15/82–87, 15/340.3, 340.4; 298/11; 280/711–714; 134/6, 21

[56] References Cited

U.S. PATENT DOCUMENTS

| | | | |
|---|---|---|---|
| 2,998,264 | 8/1961 | Stump | 280/711 |
| 3,064,761 | 11/1962 | Ramsey . | |
| 3,293,679 | 12/1966 | Murphy | 15/84 |
| 4,171,551 | 10/1979 | Hildebrand et al. | 15/84 |
| 4,856,812 | 8/1989 | Stephens et al. | 280/711 |

FOREIGN PATENT DOCUMENTS

| | | | |
|---|---|---|---|
| 1026771 | 3/1958 | Fed. Rep. of Germany | 15/82 |
| 2455200 | 5/1976 | Fed. Rep. of Germany | 15/82 |
| 1007574 | 4/1952 | France | 15/82 |

OTHER PUBLICATIONS

Drawing No. 49080 of Hendrickson Suspension "HA-Single" Axle.
Air Spring No. 1R8–021 Manufactured by Goodyear Jul. 1988.
Pp. 48–49 of Athey Parts Manual for Models AHL & ABD-Single Engine Sweepers.
Brouchure for Two New Masts for Forklifts Manufactured by Olofsson Corp. 1989.
1979 Brochure by the Knickerbocker Company.

*Primary Examiner*—Edward L. Roberts
*Attorney, Agent, or Firm*—Leydig, Voit & Mayer

[57] ABSTRACT

A vehicle having a collecting and hauling system for collecting and hauling refuse in a containment vessel to a predetermined location. In the illustrated embodiment, a street sweeper having a street sweeping system utilizes a vertically extendable mast for elevating its hopper for dumping purposes. Additionally, air springs are provided to the wheel suspension system so that the air springs, when inflated, elevate the chassis and street sweeping system for road travel. When deflated, the chassis is lowered into solid support on the suspension system to provide a more rigid suspension for improved street sweeping and hopper dumping operation. Also, the street sweeper has a conveyor for conveying the dirt from dirt collection means upwardly into the hopper. A second air spring having resilient chamber walls is provided to support the conveyor means in movable relation so that it may be rotated upwardly in travelling position by inflation of the air spring and lowered into operating position by deflation thereof. The conveyor is preferably suspended from the chassis by pivotally hanging links to permit the conveyor to move between raised and lowered positions. Also, the street sweeping system includes a rotary broom which is pivotally carried, and third adjustable air springs are provided to control the vertical position of the broom and its pressure against the ground by the air pressure in the resilient-walled third air springs.

36 Claims, 6 Drawing Sheets

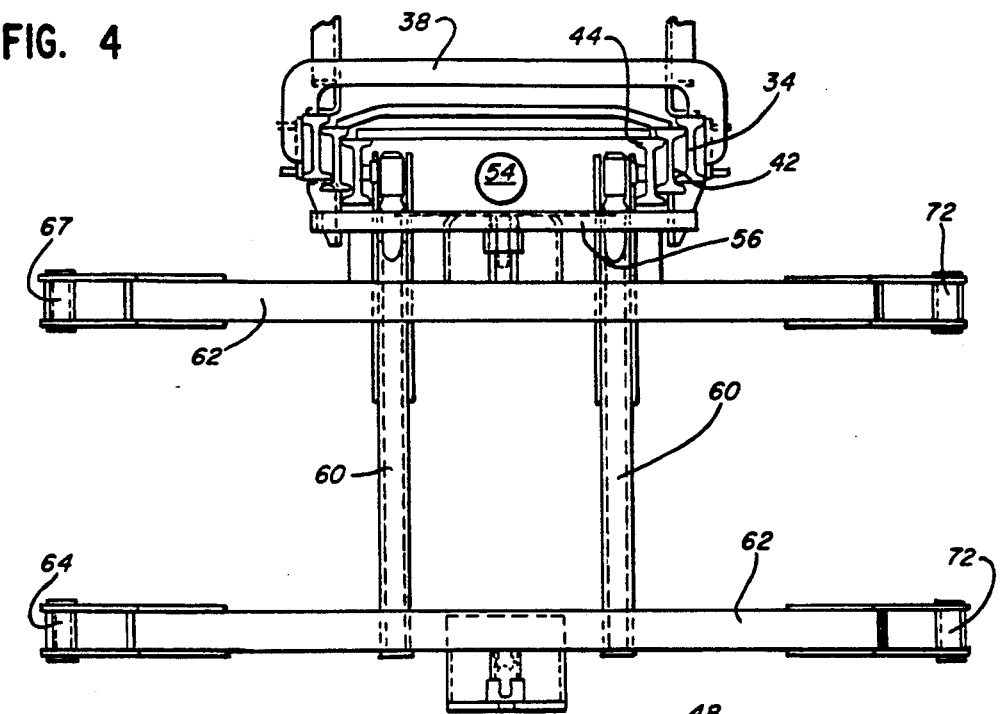
FIG. 4
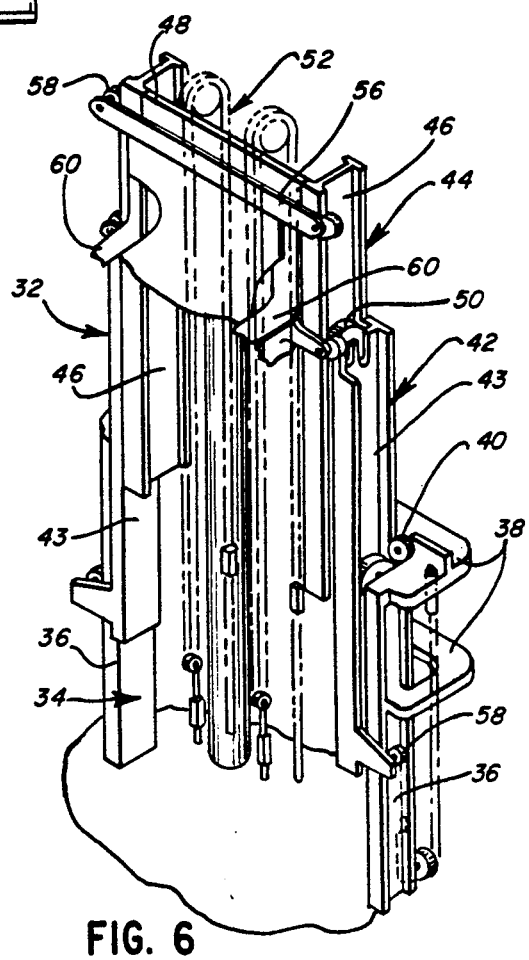
FIG. 5
FIG. 6

STREET SWEEPER

RELATED CASES

This application is a continuation-in-part of U.S. application Ser. No. 07/241,329, filed on Sep. 7, 1988, and which issued as U.S. Pat. No. 5,060,334 to Strauser et al. on Oct. 29, 1991.

BACKGROUND OF THE INVENTION

Vehicles for collecting and hauling refuse material, such as street sweepers, are capable of dislodging and picking up dirt and debris from the street, typically by means of a brush, and conveying the dirt to a hopper for storage. When the hopper is to be dumped, it is desirable for the entire hopper to be tipped so that contents slide out from the hopper by gravity into a garbage dump or other storage area.

In the prior art, a street sweeper manufactured by Mobile Athey Inc. utilizes a hopper that is elevatable by a scissor type lift, so that the hopper can be elevated over the side of a dumpster, for example. The hopper can be tilted sideways for dumping. Such a structure is of substantial complexity, having many moving parts. Typically, five scissors stages are required, along with four pressure cylinders for the hydraulic lift system, all of which is rather expensive and complex. Additionally, the hopper at the top of its elevation on such a scissor type lift is less rigid in its support, being subject to significant oscillation and bending, which is clearly undesirable and, if the oscillations are taken to an extreme, can result in damage to the mechanism.

In the illustrated embodiment of an improved street sweeper with an elevatable hopper is provided, in which a more reliable, simpler mast-type hopper lift system is provided. The street sweeper of this invention is capable of elevating a fully loaded hopper with much less oscillation and flexing of the hopper in its elevated condition, the entire lift system being more rigid and stronger than in the prior art. Additionally, the lift system used in this invention is simpler, less expensive, and more reliable than the system of the prior art.

While it is desirable for a street sweeper to have a relatively rigid suspension system for its wheels as it proceeds along in the street sweeping mode at typically a low rate of speed, it would be desirable for a street sweeper to have a softer, more resilient wheel suspension for higher speed road travel. The more rigid suspension system is desirable so that the brush and dust collector members will not bounce on the road during the sweeping operation as the street sweeper moves forward. At the same time, when the street sweeping members are lifted out of the way and the sweeper vehicle is travelling at normal road speeds, a resilient suspension is more desirable.

Similarly, in street sweepers which utilize a mechanical conveyor such as a conveyor belt for carrying dirt from the dirt collection means upwardly into the hopper, it is desirable for the conveyor to be mounted on a resilient suspension system, so that the bottom of the conveyor can resiliently conform to irregularities in the road along which it travels during street sweeping processes. Thus, the conveyor will flex upwardly when a bump is encountered, and fall downwardly into depressions, to conform to the road surface for better street sweeping capability.

Additionally, during normal speed road travel, it is desired for the conveyor to be lifted out of the way so that its road engaging end does not contact the road in that circumstance.

By this invention, a novel suspension system for street sweeper conveyors is provided to accomplish the above purposes.

Additionally, it is desirable for the rotary broom that is usually found on a street sweeper to engage the road in a resilient manner during operation, in which the pressure of the broom against the road is relatively constant. This provides improvements over a rigid suspension of the broom in that, as the bristles of the of the broom wear, a pressure-dictated suspension system will spontaneously adjust the broom to the appropriate height at which the pressure of the broom against the road is of a predetermined value, so that the broom automatically compensates for wearing of bristles during operation.

By this invention, all or some of the above features and advantages may be incorporated into a haulage vehicle such as a street sweeper, to provide significantly improved operation with simplified, more reliable structure and reduced cost.

DESCRIPTION OF THE INVENTION

In this invention, a refuse vehicle is provided which carries elevatable hoppers. Hopper elevation means are provided which comprises a first, vertically extending mast section carried by the street sweeper. An intermediate, vertically extending mast section is carried by the first mast section, and means for vertically elevating the intermediate mast section over the first mast section are provided. Also, an added, vertically extending mast section is carried by the intermediate mast section, and means for vertically elevating the added mast section over the intermediate mast section are also provided.

The hopper is carried by the added mast section. Means are also provided for laterally tipping the hopper, to dump its contents while the intermediate and added mast sections are either in vertically elevated or retracted positions.

Thus, by the use of elevatable mast sections, the hopper can be elevated in a simplified manner, which provides improved rigidity of mounting to even a heavily loaded hopper, for improved performance of the device of this invention over prior art devices.

The vertically elevatable mast assembly is basically well known in the art as used for other purposes and functions. For example, an elevatable mast assembly comprising movable mast sections and a lifting mechanism is commercially available from the Knickerbocker Co. of Jackson, Mich. The means for adapting the known elevatable mast assembly to elevate a side dumping street sweeper hopper is readily understandable to mechanical engineers who have the disclosures of this invention before them. Specifically, the hopper elevation means of this invention may utilize means for vertically elevating the intermediate and added mast sections which comprises a single, centrally located hydraulic cylinder plus chain drive means to particularly lift the hopper with respect to the added mast section.

Thus, while the prior art requires four hydraulic cylinders, the improved elevatable hopper of this invention may utilize a single cylinder.

Additionally, the vehicle of this invention, which comprises a chassis, wheels carried on a suspension system, and in the illustrated embodiment a street sweeping system carried on the chassis, may have an improved wheel suspension system exhibiting the advantages described above.

The wheel suspension system of this invention may comprise adjustable air spring means positioned to support the chassis on the suspension system. The air spring means comprises a plurality of compressed air chambers having resilient walls. Such air spring means are available per se from commercial manufacturers such as the Goodyear Tire and Rubber Company. In the prior art, such air springs are used in truck suspension systems, being typically inflated at all times to provide the desired suspension.

However, in accordance with this invention, the air spring means for the wheel suspension system is an adjustable air spring means intended for use in inflated condition sometimes and deflated condition at other times.

Means are provided for controlling the pressure of air in the resilient-walled air chambers of the air spring. Seat means are also provided, being carried respectively by the suspension system and the chassis, for supporting engagement with each other when the pressure controlling means drops the air pressure in the chambers of the air springs. The effect of this is to cause the chassis to be solidly supported on the suspension system by rigid, mechanical engagement through the seat means. In this position, the illustrated street sweeping system occupies a vertically lower position for street sweeping operation. Thus, the rotary brushes, the street sweeping head, and the conveyor system can all be lowered into engagement with the street as the air spring means is deflated, with the suspension system being thus relatively rigid and mechanically linked, to minimize suspension system oscillations as the street sweeper slowly proceeds along its way. In this circumstance, the brush and the pick up head of the street sweeper can maintain good contact with the ground despite the presence of bumps and irregularities, because of the rigidity of the suspension system during street sweeping operation.

However, when it is desired to terminate the refuse gathering operations and to move at road speeds to another location, the controlling means provides air pressure to the compressed air chamber. This causes the chassis and street sweeping system to be elevated by inflation of the air springs to a vertically upper, travelling position during which the street sweeping system is out of contact with the road, and the wheel suspension assumes the normal characteristics of a wheel suspension system for a road vehicle.

Thus, the vehicle of this invention exhibits the advantage of two different suspension modes: a first mode in which the refuse gathering system is lowered into road engagement, and the suspension is relatively rigid; and a second mode in which the refuse gathering system is elevated out of road engagement, and the suspension system takes on characteristics of a normal, heavy-duty pneumatic suspension system for trucks or the like.

Additionally, it is preferred for the seat means to include a supporting surface for the supportive engagement described above in which at least one of the surfaces is made of a tough plastic having greater resilience than structural metal, for example Hytrel plastic sold by DuPont, or hard rubber, or another equivalent material. This contributes to a residue of shock absorption capability to the suspension system in the deflated, mechanically linked configuration.

Additionally, in accordance with this invention, the street sweeper of the illustrated embodiment, which comprises a chassis, a hopper, dirt collection means, and conveyor means for conveying dirt from the dirt collection means upwardly into the hopper, may also include adjustable air spring means positioned to support the conveyor means in movable relation. As before, the air spring means may be in itself of conventional design, comprising a compressed air chamber having resilient walls, but applied to a novel function.

Means are provided for controlling the pressure of air in the chamber. As a result of this, the conveyor means may be raised into a travelling position, and lowered into an operating position by control of air pressure in the chamber. Also, the air chamber can serve as a shock absorber and an oscillation dampener for the conveyor means.

It should be noted that resilient-walled air spring means as used in this invention provide greatly improved oscillation dampening means over rigid walled pneumatic or hydraulic cylinders and the like, for significantly improved results in accordance with this invention.

It is desirable for the conveyor means to be an elongated member extending diagonally upwardly, one end communicating with the dirt collection means engaging the street, and the other end communicating with typically the top of the hopper for receiving dirt and debris. Preferably, the conveyor means is suspended from the chassis by pivotally hanging link means to permit the conveyor means to move between raised and lowered positions as controlled by the air pressure controlling means acting on the air spring means. Thus, the bottom end of the conveyor may be lifted out of road engagement for travelling by sufficient inflation of the air spring. Likewise, a reduction of inflation can bring the conveyor means into road engagement at a pressure which is governed by the air press, the chamber. Thus, the conveyor means is capable of bouncing upwardly in the event it strikes a large stone or the like to avoid damage to the system.

Additionally, the illustrated embodiment of the invention relates to a street sweeper that comprises a chassis and a street sweeping system carried on the chassis, which includes a rotary broom for dislodging street dirt. In accordance with the invention, the broom is carried on arm means which are pivotally attached to the chassis so that the broom is vertically movable by pivotal motion of the arm means. Additionally, added adjustable air spring means connect the arm means with the chassis at a point spaced from the pivotal attachment of the arm means. As before, the air spring means comprise a compressed air chamber having resilient walls. Means are provided for controlling the pressure of air in the chamber.

Accordingly, the vertical position of the broom can be controlled by the pressure of air in the chamber. A significant advantage of such pressure-dependent control rather than position-oriented control is that the broom can be adjusted to press against the street with a force predetermined by the pressure of air in the chamber, while the vertical position that the broom assumes during operation is that position necessary to apply such a force. Thus, as the broom wears, it automatically adjusts to the street to provide the desired sweeping force against the street, such force being as determined by the air pressure in the chamber. Likewise, upon encountering bumps and depressions in the street, the broom can move upwardly and downwardly in response thereto in a spontaneous manner.

It is preferred for shock-induced oscillations of the arm means to be damped by shock absorber means connected between the chassis and the arm.

Accordingly, the refuse vehicle of this invention exhibits a series of significant structural distinctions and advantages over the prior art street sweepers described above.

DESCRIPTION OF DRAWINGS

FIG. 4 is a fragmentary, plan view of the hopper support and hopper elevation means of the street sweeper of FIGS. 1 through 3;

FIG. 5 is a perspective view of the mast sections of the hopper elevation means, shown in their retracted position;

FIG. 6 is a perspective view similar to that of FIG. 5, showing the mast sections in their vertically elevated position;

FIG. 9 is a sectional view of a typical air spring used in the street sweeper of FIG. 1.

Figure 1:
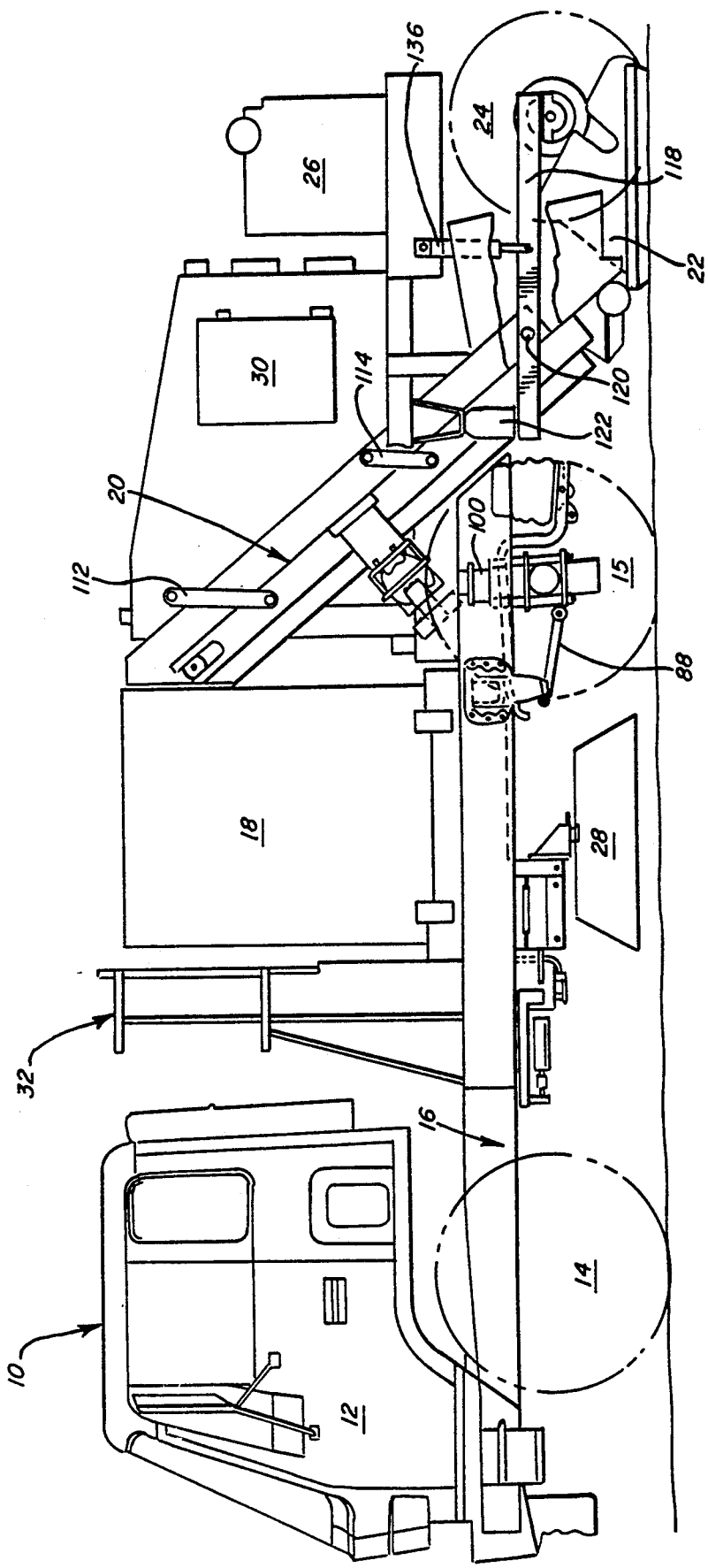
FIG. 1 is a side elevational view, with some vertical wall portions removed for clarity, of one embodiment of a street sweeper in accordance with this invention.
Figure 2:
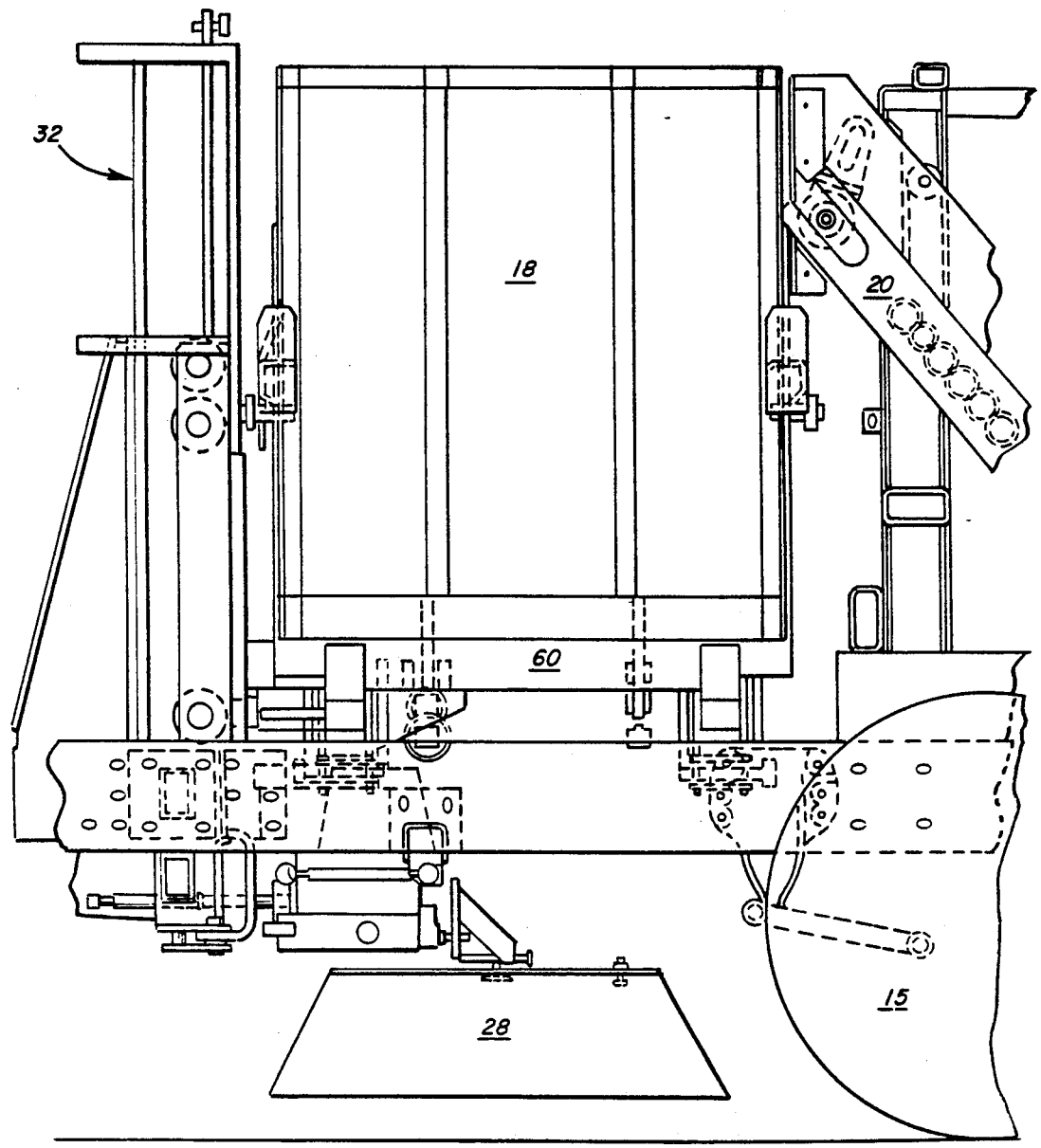
FIG. 2 is an enlarged, fragmentary elevational view of the street sweeper of FIG. 1 showing more details.

While the invention will be described in connection with a street sweeper, there is no intent to limit it to such an application. On the contrary, the intent is to cover all types of haulage vehicles within the spirit and scope of the invention as defined by the appended claims.

DESCRIPTION OF SPECIFIC EMBODIMENTS

Referring to the drawings, there is shown a vehicle for collecting and hauling material such as refuse. A typical vehicle has a cab 12, wheels 14, 15, and chassis, which is driven in a standard manner. In order to collect and haul refuse, the vehicle will typically have a collecting and hauling system that collects and hauls the refuse in a containment vessel to a predetermined destination. It will be appreciated, however, that the method of the invention can be practiced by all types of vehicles used for collecting and hauling material such as refuse—e.g., garbage trucks, dump trucks and other vehicles modified for curb pickup of refuse containers.

In the illustrated embodiment, the vehicle for collecting and hauling material is a street sweeper. The collecting and hauling system of the street sweeper comprises a street sweeping system having a hopper 18 mounted on chassis 16, and a conveyor member 20. Only one hopper is shown in order to simplify the Figures. However, it will be appreciated that more than one hopper 18 can be mounted on chassis 16. For example, a vehicle may have three hoppers—one for collecting paper, a second for collecting glass, and third hopper for collecting metal. The conveyor member 20 is typically a conveyor belt for carrying dust and dirt which is disturbed off of the road for pick-up by transversely disposed, motor operated main broom 24 and collected by collection head 22. The above-described parts may all be of conventional design, and may function in substantially the manner of prior art street sweepers.

As additional conventional parts, power unit 26 is provided for powering main broom 24, side brooms 28, conveyor 20, and the lift mechanism 32 for hopper 18. Power unit 26 may be a diesel engine, powered by fuel from fuel tank 30.

In accordance with this invention, hopper elevation means 32 is provided. As shown in FIGS. 2 through 6, elevation means 32 comprises a first, vertically extending mast section 34 which is shown to comprise a pair of vertical channel iron members 36 held together by horizontal support members 38.

Positioned within first mast section 34, in vertically sliding rolling relation assisted by rollers 40, is intermediate mast section 42 comprising similar I-beam or channel shaped vertical members 43. Positioned within intermediate mast section 42 is vertically extending, added mast section 44, which also comprises vertically extended I-beam members 46 as shown in FIGS. 5 and 6, secured together by horizontal members 48. Rollers 50 are provided to facilitate the vertical sliding between intermediate mast section 42 and added mast section 44 so that elevation means 32 may move upwardly to a vertically extended position as in FIG. 6 or downwardly to a vertically retracted position as in FIG. 5, as operated by vertical elevating means comprising chain and pulley system 52, driven by a hydraulic system including centrally positioned cylinder 54 to elevate or lower the mast-type elevation system 32.

Specifically the bottom of cylinder 54 is attached to intermediate mast section 42 while the operating rod thereof is attached to added mast section 44. Hopper carrier 56 is raised and lowered on mast section 44 by a chain connected to mast section 44, to raise as section 44 raises and to lower as it lowers. Intermediate mast section is also raised and lowered on first mast section 34 by another chain connected to added mast section 44. Thus hydraulic cylinder lift 54 raises and lowers all parts of elevation mechanism 42, with hopper carrier 56 raising or lowering two inches for every one inch of movement by cylinder 54.

Carrier 56 rolls on added mast section 44 by means of rollers 58, to be elevated to the upper end of added mast section 44 by chain and pulley system 52 in the extended position of FIG. 6, or to be retracted in the retracted configuration of FIG. 5.

The specific arrangement of the three mast sections 34, 42, 44 and their chain and pulley system for elevating and lowering, is a known and commercially available structure.

Figure 3:
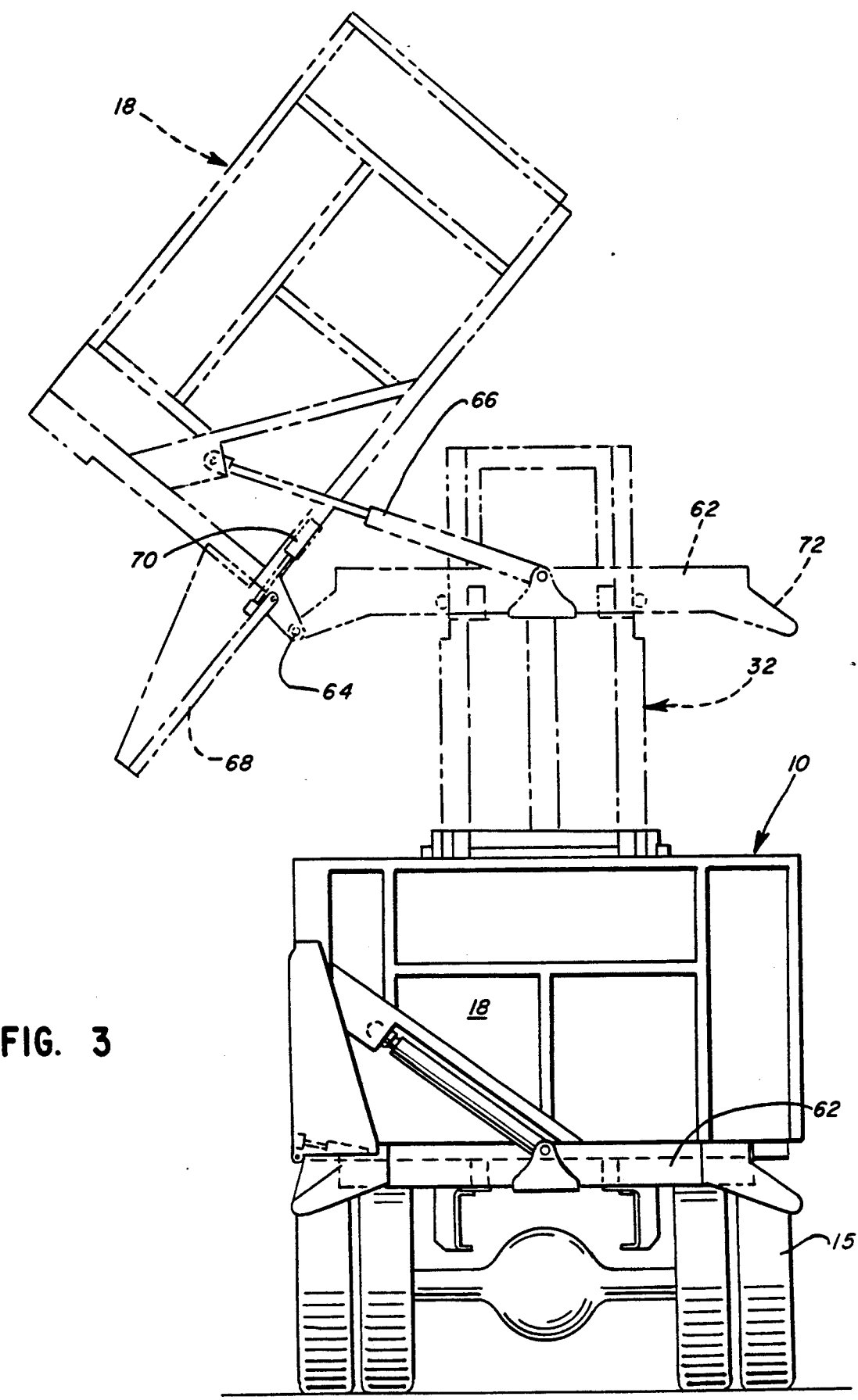
FIG. 3 is a rear elevational view of the street sweeper of FIG. 1, showing the hopper in its elevated position in phantom lines and with rear portions of the street sweeper removed for clarity of illustration.

Carrier 56 includes horizontal arm members 60 which, in turn, carry cross members 62 which support hopper 18. Thus, as mast-type elevation means 32 is extended into the configuration of FIG. 6, hopper 18 is elevated with it, as shown in FIG. 3. When it is desired to dump the hopper, hopper 18 is so elevated, and then tipped about pivot 64 by hydraulic cylinders 66. Simultaneously, side door 68 is opened by action cylinder 70, to permit the contents of hopper 18 to be dumped to the side of street sweeper 10. If can be seen in FIG. 3 that rear portions of the street sweeper vehicle have been removed for clarity of the illustration of hopper action.

By this means, a street sweeper with an elevatable, side dumping hopper is provided, exhibiting the significant improvements and advantages over the prior art as described above.

If desired, central hydraulic cylinder 54 may be replaced by a pair or laterally disposed cylinders so as to clear the central area between the respective vertical members of the mast sections. In such a circumstance, an arrangement can be used where forward dumping could be provided to the vehicle. The conveyor in that circumstance could project forwardly, while the hopper raises to its maximum height where the bottom of the hopper is a little above the height of the conveyor. Then the conveyor can shift back rearwardly and fit into the central area where cylinder 54 currently resides. The hopper can then dump from the bottom onto a horizontal conveyor, as an alternative embodiment to this present structure.

Figure 7:
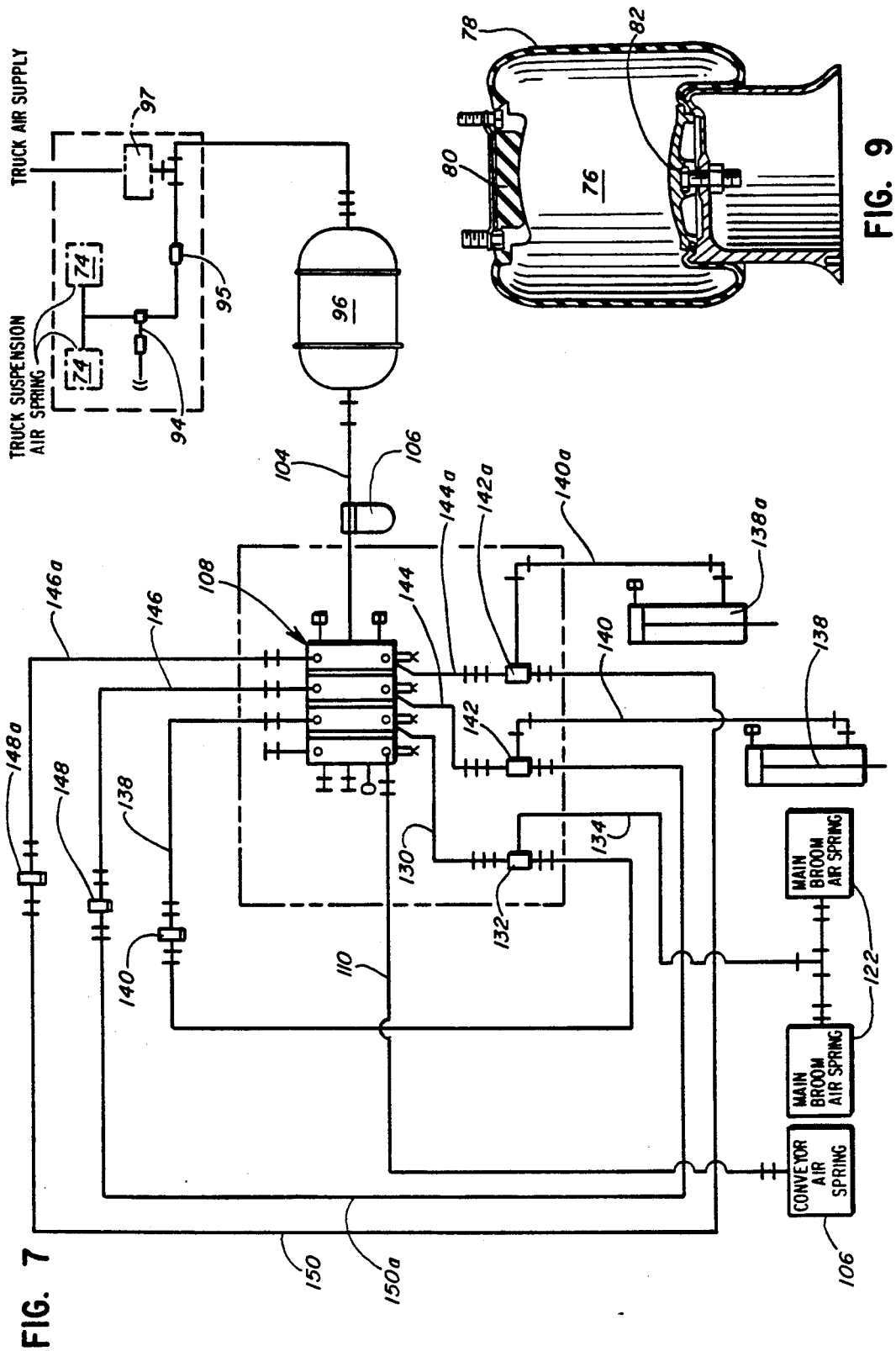
FIG. 7 is a pneumatic circuit diagram of the air spring system of the street sweeper of FIGS. 1 through 6.
Figure 8:
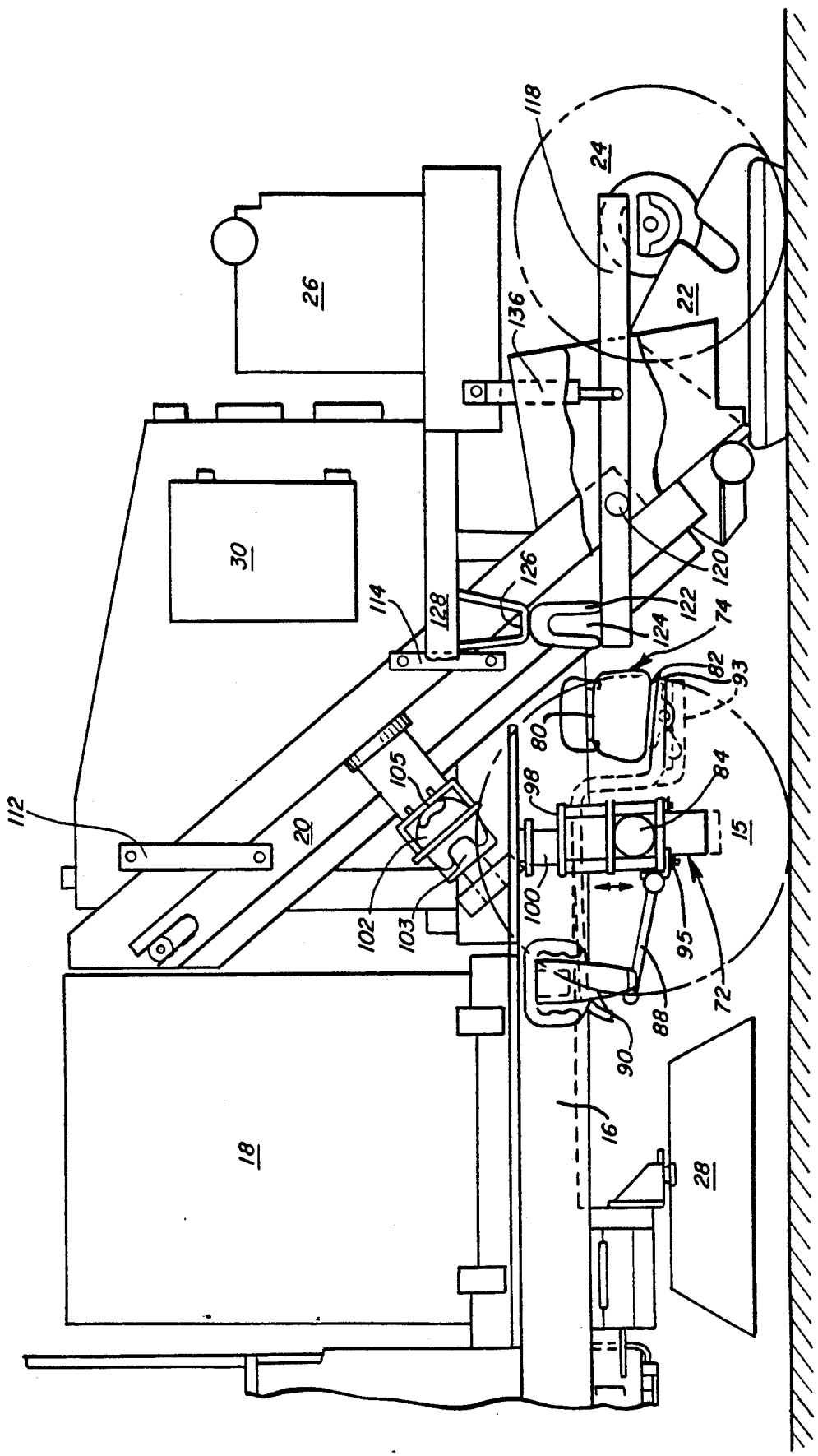
FIG. 8 is an enlarged, fragmentary, side elevational view (with some vertical walls removed) of a portion of the street sweeper of FIG. 1.

In the embodiment shown, hopper 18 can be modified to dump either to the left or right. The specific shape shown in phantom in FIG. 3 of cross members 62 illustrates the presence of auxiliary projection 72. If desired, pivot 64 could be provided at auxiliary projection 72, with hopper 18 being reversed in its position to dump to the other side of the vehicle. Referring now particularly to FIGS. 7 through 9, the novel pneumatic suspension system of the street sweeper of this invention is illustrated.

In one aspect thereof, a suspension system for at least rear wheels 15 is provided for suspending chassis 16 in a resilient manner on wheels 15. The suspension system 72 includes adjustable air spring 74 connected at its lower end to frame bar 93, which connects to spring hanger 90, carried on chassis 16. As shown in FIG. 9, a typical air spring of the type used in various places in this invention comprises a compressed air chamber 76 which may be made of a tube of appropriate rubber of thick wall section, for example one quarter to one half inch in thickness. At the respective ends of tube 78 are end seals 80, 82 which are respectively attached to the working parts to be suspended by the system. Specifically, lower end-seal 82 is attached to the frame bar 93 which supports wheel 15, through "U" bolts 125 and axle 84. Upper end seal 80 is attached to chassis 16, so that shock imparted to wheels 15 upon travel is absorbed. Axle 84 of wheels 15 is retained in suspension system 72, which is connected by suspension arm 88 to spring hanger 90. Spring hanger 90 is, in turn, attached to chassis 16, chassis 16 carrying the main parts of the vehicle including the street sweeping apparatus, hopper 18, and the like.

As shown particularly in FIG. 7, air springs 74 are positioned on either side of the vehicle, and connected to an air supply control 94 which in turn obtains air from a master cylinder 96. Air supply control 94 may be controlled by the operator of the vehicle to inflate or deflate air springs 74. Pressure protection valve connection 97 to the truck air supply is also provided.

As shown in FIG. 8, when air springs 74 are inflated, wheel frame 72 and frame bar 93 are lowered relative to chassis 16 (see the dotted lines), causing the elevation of most of the entire vehicle that rests on chassis 16, including hopper 18, conveyor 20, and other street sweeping portions of the vehicle by rotation about front wheels 14. Thus, frame bar 93, connected to spring hanger 90, can be lowered along with frame 72 and wheels 15 relative to chassis 16 to provide an adjustable suspension system. When air spring 74 is fully inflated, the vehicle is ready for highway travel with wheels 15 lowered, and the components of the street sweeper means and chassis 16 being protected from undue shock in the conventional manner of a resilient air spring suspension system.

However, when it is desired to engage in a street sweeping operation, air supply control 94 may be actuated to deflate air springs 74. In this circumstance, chassis 16 settles to the position shown in FIG. 8, which chassis 16 settling into supportive engagement with the wheel frame 72. This engagement is provided by seat 98 attached to frame 72 for wheel 15, with seat member 100 attached to chassis 16 settling down into contact with seat member 98 to provide a suspension system for the vehicle which is much more rigid that the situation when air springs 74 are inflated, so that seats 98, 100 are vertically separated. There nevertheless is still a little bit of suspension action in the system because of the inherent flexibility of tire on each wheel 14, 15, and also in the preferred situation where at least one of seats 98, 100 have a surface of tough plastic engaging the other seat, to provide a greater resilience to the engaging seats then would be found in corresponding structural metal seats. As previously stated, DuPont Hytrel plastic may be used for this purpose. Such a rigid suspension system tends to provide better street sweeping action, when the vehicle is moving at a low rate of speed, so that collection head 22 is in better contact with the street without bouncing action that could be imparted by a more resilient suspension system.

Then, when street sweeping is finished, air springs 74 may be reinflated to raise chassis 16 and lower wheels 15 for higher speed road travel. A conventional leveler valve 95 (FIG. 7) may be provided to maintain generally constant elevation for the rear end of the frame regardless of varying amounts of load by proper adjustment of the inflation pressure of air springs 74.

Air springs 74 may also be deflated to lower chassis 16 and lower wheels 15 for added stability for the dump cycle of the hopper 18.

As another aspect of this invention, conveyor member 20, which is in itself of conventional design, is suspended in a novel manner. Adjustable air spring 102 is provided, being of a design similar to air spring 74, having a resilient-walled, tubular, compressed air chamber with sealed ends. One sealed end 103 may be attached to chassis 16, while the other sealed end 105 is attached to conveyor 20. As shown in FIG. 7, compressed air may pass through line 104 and air filter 106 at a pressure of typically 80 p.s.i. into a conventional ganged series of two way venting valves 108, which may be used to control the positions not only of conveyor 20, but also main broom 24 and side brooms 28 as described below.

By appropriate control of the ganged valves 108, compressed air may pass through line 110 to conveyor air spring 106, when desired, to raise conveyor 20.

Conveyor 20 is also supported by pivotally hanging link means 112, 114. Each of link means 112, 114 is pivotally attached to a frame portion carried on chassis 16. At the lower end of each of links 112, 114 there is pivotal attachment to conveyor 20.

Accordingly, when air spring 102 is pressurized through line 110 by control of valve assembly 108, pressure is applied to conveyor 20 by air spring 102 at an angle to the vertical as shown. Thus, links 112, 114, which tend to hang vertically because of their pivotal relation, permit conveyor 20 to swing rearwardly and in a counterclockwise manner so that the attached collection head 22 is rotated upwardly and out of contact with the road. Thus, street sweeper 10 is free to move at road speed without damaging conveyor 20 or collection head 22 by hard encounter with irregularities in the street.

When it is desired to engage in street sweeping action again, the air pressure in air spring 102 may be reduced, causing conveyor 20 to rotate in a clockwise manner to place collection head 22 back into contact with the street, for desired collection of debris and dirt.

As another aspect of this invention, broom 24 is shown to be carried on arm 118, which is pivotally mounted at pivot 120 at a point intermediate the ends of the arm, so that broom 24 is vertically movable by pivotal motion of the arm.

Another adjustable air spring 122 is provided, being of a basic design similar to that of the previous air springs in that it comprises a compressed air chamber have resilient walls, being connected at one end 124 to arm 118 and at its other end 126 to a frame portion 128 carried on chassis 16.

Separate air springs 122, carried on pivotally mounted arms 118, may be provided at each end of broom 24, which preferably extends substantially the width of street sweeper 10.

Air springs 122 may be inflated by compressed air from air source 96. The compressed air passes through valve assembly 108 into line 130. A T-connector and one way valve 132 permits compressed air to pass into line 134 to provide full line pressure to each air spring 122. The effect of this is to raise main broom 24 out of contact with the road by counterclockwise rotation of arm 118 into the travel mode for street sweeper 10.

For use of main broom 24 in the sweeping mode, air spring 122 may be depressurized, to cause main broom 24 to engage the road with its full weight. Shock absorbers 136 may be provided to damp shock-induced oscillations of arm 118.

However, it is possible to pressurize air springs 122 with less than the pressure in line 104 of typically 80 p.s.i. Valve assembly 108 can close off line 130 and open line 138. In this route, the pressurized air passes through pressure regulator 140 to reduce the air pressure as may be desired. Then, the resulting pressurized air passes through T-connector—one way valve 132 into line 134 to pressurize air springs 126 at a reduced level, as may be desired. The effect of this is to permit control of the downward pressure that broom 24 exerts against the ground. Thus, any desired brushing characteristics may be imparted to main broom 24 by controlling the pressure of air springs 122. Also, since the rotational positional of main broom 24 is controlled by the pressure rather than by a spatially fixed system, the broom accommodates for bristle wear in a spontaneous manner.

The pneumatic system of FIG. 7 also provides a control for the right and left side brooms 28, one of which is shown in FIG. 8. Pneumatic cylinders 138, 138a are connected to respective lines 140, 140a which, in turn, connect to respective T-connectors and one way valves 142, 142a. T-connector and one way valves 142, 142a are respectively connected to lines 144, 144a, which lines are connected to ganged valve assembly 108. Thus, line pressure from line 104 can pass through respective lines 144, 144a, as controlled by valve assembly 108, to directly pressurized cylinders 138, 138a for selective depression and elevation of side brooms 28. Alternatively, in a manner similar to that previously described, the valve assembly 108 can close off flow through either or both of lines 144, 144a and reroute flow through lines 146, 146a, causing pressurized air to pass respectively through pressure regulators 148, 148a. Thus, air of reduced pressure can pass through lines 150, 150a to the respective T-connector and one way valves 142, 142a to provide controlled reduced pressurization of cylinders 138, 138a. By this means, the respective side brooms 28 can also exhibit controlled pressure against the street.

Thus, a street sweeper is provided which exhibits numerous distinctions from and advantages over the prior art. An elevatable hopper is provided having improved stability and simplicity. Air spring means are used in various ways to provide selective control and good protection to the components of the vehicle of this invention.

That which is claimed is:

1. In a vehicle for collecting and hauling material which carries an elevatable hopper, the improvement comprising, in combination:

hopper elevation means for elevating the hopper which comprises a first, vertically extending mast section carried by the vehicle; an intermediate vertically extending mast section carried by the first mast section, means for vertically elevating the intermediate mast section over the first mast section; an added vertically extending mast section carried by the intermediate mast section; and means for vertically elevating the added mast section over the intermediate mast section; said hopper being carried by said added mast section; and means for laterally tipping said hopper to dump its contents while said intermediate and added mast sections are in vertically elevated position.

2. The vehicle for collecting and hauling material of claim 1 in which said means for vertically elevating said intermediate and added mast sections comprises chain drive means and a single, centrally located hydraulic cylinder.

3. In a vehicle for collecting and hauling material which comprises a chassis, wheels carried on a suspension system, and a collecting and hauling system carried on said chassis, the improvement comprising, in combination:

said wheel suspension system comprising adjustable air spring means positioned for supporting the chassis on said suspension system, said air spring means comprising a plurality of compressed air chambers having resilient walls, and means for controlling the pressure of air in said chambers; and seat means carried respectively by said suspension system and chassis for supportive engagement when the controlling means drops the air pressure in said chambers, whereby the chassis is solidly supported on the suspension system through the seat means and the collecting and hauling system occupies a vertically lower position for the collecting operation; and, when the controlling means raises the air pressure in said chambers, the chassis and the collecting and hauling system is elevated to a vertically upper, travelling position.

4. The vehicle for collecting and hauling material of claim 3 in which said seat means includes a supporting surface for said supportive engagement made of a tough plastic having a greater resilience than structural metal.

5. In a vehicle for collecting and hauling material which comprises a chassis, a hopper, dirt collection means for collecting dirt, and conveyor means for conveying dirt from the dirt collection means upwardly into said hopper, the improvement comprising, in combination:

adjustable air spring means positioned for supporting said conveyor means, said air spring means comprising a compressed air chamber having resilient walls, and means for controlling the pressure of air in said chamber, whereby said conveyor means may be raised into travelling position and lowered into operating position by control of air pressure in said chamber and said air chamber serves as a shock absorber and oscillation dampener for said conveyor means.

6. The vehicle for collecting and hauling material of claim 5 in which said conveyor means is an elongated member extending diagonally upwardly, said conveyor means being suspended from said chassis by pivotally hanging link means to permit said conveyor means to move between raised and lowered positions.

7. In a vehicle for collecting and hauling material which comprises a chassis and a collecting and hauling system carried on said chassis, said collecting and hauling system including a rotary broom for dislodging street dirt, the improvement comprising, in combination:

said broom being carried on arm means pivotally attached to said chassis whereby said broom is vertically movable by pivotable motion of said arm means; and adjustable air spring means for connecting said arm means with the chassis at a point spaced from the pivotal attachment of said arm means, said air spring means comprising a compressed air chamber having resilient walls, and means for controlling the pressure of air in said chamber, whereby the vertical position of said broom can be controlled by the pressure of air in said chamber.

8. The vehicle for collecting and hauling material of claim 7 in which shock-induced oscillations of said arm means are damped by shock absorber means.

9. The vehicle for collecting and hauling material of claim 7 in which said air spring means is positioned on said arm means with the pivotal attachment being positioned between the air spring means and the broom.

10. The vehicle for collecting and hauling material of claim 7 comprising pneumatic means for providing variably controllable compressed air to said air spring means, so that the pressure of the broom against the ground may be adjusted as desired in a manner dependent upon the variable air pressure within said air spring means.

11. In a vehicle for collecting and hauling material which comprises a chassis, wheels carried on a suspension system, a collecting and hauling system carried on the chassis, and including an elevatable hopper, the improvement comprising, in combination:

hopper elevation means for elevating the hopper which comprises a first, vertically extending mast section carried by the street sweeper; an intermediate, vertically extending mast section carried by the first mast section, means for vertically elevating the intermediate mast section over the first mast section; an added, vertically extending mast section carried by the intermediate mast section; and means for vertically elevating the added mast section over the intermediate mast section; said hopper being carried by said added mast section; means for laterally tipping said hopper to dump its contents while said intermediate and added mast sections are in vertically elevated position; said wheel suspension system comprising adjustable air spring means positioned for supporting the chassis on said suspension system, said air spring means comprising a plurality of compressed air chambers having resilient walls, and means for controlling the pressure of air in said chambers; and seat means carried respectively by said suspension system and chassis for supportive engagement when the controlling means drops the air pressure in said chambers, whereby the chassis is solidly supported on the suspension system through the seat means and the collecting and hauling system occupies a vertically lower position for the collecting operation; and, when the controlling means raises the air pressure in said chambers, the chassis and collecting and hauling system is elevated to a vertically upper, travelling position.

12. The vehicle for collecting and hauling material of claim 11 wherein the collecting and hauling system comprises dirt collection means for collecting dirt, and conveyor means for conveying dirt from the dirt collection means upwardly into said hopper; adjustable second air spring means positioned for supporting said conveyor means, said second air spring means comprising a compressed air chamber having resilient walls, and means for controlling the pressure of air in said chamber, whereby said conveyor means may be raised into travelling position and lowered into operation position by control of air pressure in said chamber and said air chamber serves as a shock absorber and oscillation dampener for said conveyor means.

13. The vehicle for collecting and hauling material of claim 12 in which said conveyor means is an elongated member extending diagonally upwardly, said conveyor means being suspended from said chassis by pivotally hanging link means to permit said conveyor means to move between raised and lowered positions.

14. The vehicle for collecting and hauling material of claim 13 wherein the dirt collection means comprises a rotary broom for dislodging street dirt, said broom being carried on arm means pivotally attached to said chassis whereby said broom is vertically movable by pivotal motion of said arm means; and third adjustable air spring means connecting said arm means with the chassis at a point spaced from the pivotal attachment of said arm means, said third air spring means comprising a compressed air chamber having resilient walls, and means for controlling the pressure of air in the chamber, whereby the vertical position of said broom can be controlled by the pressure of air in said chamber.

15. The vehicle for collecting and hauling material of claim 14 in which said means for vertically elevating said intermediate and added mast sections comprises hydraulic chain drive means and a single, centrally located hydraulic cylinder.

16. The vehicle for collecting and hauling material of claim 14 in which said seat means includes a supporting surface for said supportive engagement between the suspension system and chassis, said supporting surface being made of a tough plastic having a greater resilience that structural metal.

17. The vehicle for collecting and hauling material of claim 14 in which shock-induced oscillations of said arm means are damped by shock absorber means.

18. The vehicle for collecting and hauling material of claim 14 in which said third air spring means is positioned on said arm means with the pivotal attachment being positioned between the air spring means and the broom.

19. In a vehicle for collecting and hauling material which carries an elevatable hopper, a chassis, dirt collection means for collecting dirt, and conveyor means for conveying dirt from the dirt collection means upwardly into said hopper, the improvement comprising, in combination:

hopper elevation means for elevating the hopper which comprises a first, vertically extending mast section carried by the street sweeper; an intermediate, vertically extending mast section carried by the first mast section; means for vertically elevating the intermediate mast section over the first mast section; an added, vertically extending mast section carried by the intermediate mast section; and means for vertically elevating the added mast section over the intermediate mast section; said hopper being carried by said added mast section; and means for laterally tipping said hopper to dump its contents while said intermediate and added mast sections are in vertically elevated position; adjustable air spring means positioned for supporting said conveyor means in movable relation, said air spring means comprising a compressed air chamber having resilient walls, and means for controlling pressure of air in said chamber, whereby said conveyor means may be raised into traveling position and lowered into operating position by control of air pressure in said chamber and said air chamber serves as a shock absorber and oscillation dampener for said conveyor means.

20. The vehicle for collecting and hauling material of claim 19 wherein the dirt collection means comprises a rotary broom for dislodging street dirt, said broom being carried on arm means pivotally attached to said chassis whereby said broom is vertically movable by pivotable motion of said arm means; an added adjustable air spring means for connecting said arm means with the chassis at a point spaced from the pivotal attachment of said arm means, said added air spring means comprising a compressed air chamber having resilient walls, and means for controlling the pressure of air in said chamber, whereby the vertical position of said broom can be controlled by the pressure of air in said chamber.

21. The vehicle for collecting and hauling material of claim 20 in which said air spring means is positioned on said arm means with the pivotal attachment being positioned between the air spring means and the broom.

22. The vehicle for collecting and hauling material of claim 21 in which said conveyor means is an elongated member extending diagonally upwardly, said conveyor means being suspended from said chassis by pivotally hanging link means to permit said conveyor means to move between raised and lowered positions.

23. In a vehicle for collecting and hauling material which comprises a chassis, wheels carried on a suspension system, and a collecting and hauling system which comprises a hopper, dirt collection means for collecting dirt, and conveyor means for conveying dirt from the dirt collection means upwardly into said hopper, the improvement comprising, in combination:

said wheel suspension system comprising a first adjustable air spring means positioned for supporting the chassis on said suspension system, said first air spring means comprising a plurality of compressed air chambers having resilient walls, and means for controlling the pressure of air in said chambers; and seat means carried respectively by said suspension system and chassis for supportive engagement when the controlling means drops the air pressure in said chambers, whereby the chassis is solidly supported on the suspension system through the seat means and the collecting and hauling system occupies a vertically lower position for the collecting operation; and, when the controlling means raises the air pressure in said chambers, the chassis and the collecting and hauling system is elevated to a vertically upper, travelling position; second adjustable air spring means positioned for supporting said conveyor means in movable relation, said second air spring means comprising a compressed air chamber having resilient walls, and means for controlling the pressure of air in said chamber, whereby said conveyor means may be raised into travelling position and lowered into operating position by a control of air pressure in said chamber and said air chamber serves as a shock absorber and oscillation damper for said conveyor means.

24. The vehicle for collecting and hauling material of claim 23 in which said conveyor means is an elongated member extending diagonally upwardly, said conveyor means being suspended from said chassis by pivotally hanging link means to permit said conveyor means to move between raised and lowered positions.

25. The vehicle for collecting and hauling material of claim 24 in which said seat means includes a supporting surface for said supportive engagement made of a tough plastic having greater resilience than structural metal.

26. The vehicle for collecting and hauling material of claim 24 wherein the dirt collection means comprises a rotary broom for dislodging street dirt, said broom being carried on arm means pivotally attached to said chassis whereby said broom is vertically movable by pivotable motion of said arm means; and third adjustable air spring means for connecting said arm means with the chassis at a point spaced from the pivotal attachment of said arm means, said third air spring means comprising a compressed air chamber having resilient walls, and means for controlling the pressure of air in said chamber, whereby the vertical position of said broom can be controlled by the pressure of air in said chamber.

27. The vehicle for collecting and hauling material of claim 26 in which said air spring means is positioned on said arm means with the pivotal attachment being between the air spring means and the broom.

28. In a vehicle for collecting and hauling material which comprises a chassis, wheels carried on a suspension system, and a collecting and hauling system carried on said chassis, said collecting and hauling system including a rotary broom for dislodging street dirt, the improvement comprising, in combination:

said wheel suspension system comprising adjustable air spring means positioned for supporting the chassis on said suspension system, said air spring means comprising a plurality of compressed air chambers having resilient walls, and means for controlling the pressure of air in said chambers; and seat means carried respectively by said suspension system and chassis for supportive engagement when the controlling means drops the air pressure in said chambers, whereby the chassis is solidly supported on the suspension system through the seat means and the collecting and hauling system occupies a vertically lower position for the collecting operation; and, when the controlling means raises the air pressure in said chambers, the chassis and the collecting and hauling system is elevated to a vertically upper, travelling position; said broom being carried on arm means pivotally attached to said chassis whereby said broom is vertically movable by pivotal motion of said arm means; and added adjustable air spring means for connecting said arm means with the chassis at a point spaced from the pivotal attachment of said arm means, said added air spring means comprising a compressed air chamber having resilient walls, and means for controlling the pressure of air in said chamber, whereby the vertical position of said broom can be controlled by the pressure of air in said chamber.

29. The vehicle for collecting and hauling material of claim 28 in which said seat means includes a supporting surface for said supportive engagement made of a tough plastic having a greater resilience than structural metal.

30. In a vehicle for collecting and hauling material which comprises a chassis, and a collecting and hauling system carried on said chassis comprising a hopper, dirt collection means, conveyor means of for conveying dirt from the dirt collection means upwardly into said hopper, and a rotary broom for dislodging street dirt, the improvement comprising, in combination:

adjustable air spring means positioned for supporting said conveyor means, said air spring means comprising a compressed air chamber having resilient walls, and means for controlling the pressure of air in said chamber, whereby said conveyor means may be raised into travelling position and lowered into operating position by control of air pressure in said chamber and said air chamber serves as a shock absorber and oscillation dampener for said conveyor means; said broom being carried on arm means pivotally attached to said chassis whereby said broom is vertically movable by pivotable motion of said arm means; an added adjustable air spring means for connecting said arm means with the chassis at a point spaced from the pivotal attachment of said arm means, said added air spring comprising a compressed air chamber having resilient walls, and means for controlling the pressure of air in said chamber, whereby the vertical position of said broom can be controlled by the pressure of air in said chamber.

31. The vehicle for collecting and hauling material of claim 30 in which said conveyor means is an elongated member extending diagonally upwardly, said conveyor means being suspended from said chassis by pivotally hanging link means to permit said conveyor means to move between raised and lowered positions.

32. In a vehicle for collecting and hauling material which comprises a chassis and a collecting and hauling system carried on the chassis, said collecting and hauling system including an elevatable hopper, means for conveying street dirt into said hopper, and a rotary broom for dislodging street dirt, the improvement comprising, in combination:

hopper elevation means for elevating the hopper which comprises a first, vertically extending mast section carried by the street sweeper; an intermediate, vertically extending mast section carried by the first mast section, means for vertically elevating the intermediate section over the first mast section; and added, vertically extending mast section carried by the intermediate mast sections; and means for vertically elevating the added mast section over the intermediate mast section; said hopper being carried by said added mast section; and means for laterally tipping said hopper to dump its contents while said intermediate and added mast sections are in vertically elevated position; said broom being carried on arm means pivotally attached to said chassis whereby said broom is vertically movable by pivotal motion of said arm means; and adjustable air spring means for connecting said arm means with the chassis at a point spaced from the pivotal attachment of said arm means, said air spring means comprising a compressed air chamber having resilient walls, and means for controlling the pressure of air in said chamber, whereby the vertical position of said broom can be controlled by the pressure of air in said chamber.

33. A method of collecting and hauling material with a vehicle which comprises a chassis, wheels carried on a suspension system, and a collecting and hauling system carried on the chassis, including the steps of:

elevating said wheel suspension system and chassis by pressurizing adjustable air spring means positioned for supporting the chassis on the suspension system, said air spring means comprising a plurality of compressed air chambers having resilient walls, to permit the vehicle to travel at road speeds while keeping the collecting and hauling system spaced from the road, and thereafter deflating said air spring means to lower said chassis and collecting and hauling system into road engagement while said chassis and suspension system enter into supportive engagement together by seat means carried respectively by the suspension system and chassis, whereby the chassis is solidly supported on the suspension system through the seat means as the collecting and hauling system is in road engagement to provide a stiffer suspension system during the collecting operation than in the circumstance when the chassis and collecting and hauling system are elevated for road travel.

34. The method of claim 33 in which said seat means includes an engaging supporting surface for said supportive engagement which is made of a tough plastic having a greater resilience than structural metal.

35. A method of street sweeping with a street sweeper which comprises a chassis, wheels carried on a suspension system, and a street sweeping system carried on the chassis, including the steps of:

elevating said wheel suspension system and chassis by pressurizing adjustable air spring means positioned for supporting the chassis on the suspension system, said air spring means comprising a plurality of compressed air chambers having resilient walls, to permit the street sweeper to travel at road speeds while keeping the street sweeping system spaced from the road, and thereafter deflating said air spring means to lower said chassis and street sweeping system into road engagement while said chassis and suspension system enter into supportive engagement together by seat means carried respectively by the suspension system and chassis, whereby the chassis is solidly supported on the suspension system through the seat means as the street sweeping system is in road engagement to provide a stiffer suspension system during street sweeping operation than in the circumstance when the chassis and street sweeping system are elevated for road travel.

36. The method of claim 35 in which said seat means includes an engaging supporting surface for said supportive engagement which is made of a tough plastic having a greater resilience than structural metal.

* * * * *